Patented Jan. 2, 1951

2,536,312

UNITED STATES PATENT OFFICE 2,536,312

FISHING LINE

Öivin Saether, Aalesund, Norway

No Drawing. Application February 12, 1948, Serial No. 7,992. In Norway February 7, 1944

1 Claim. (Cl. 28—80)

This invention relates to a new and useful improvement in fishing lines, as set forth in the following specification:

Among the objects of this invention are to produce a fishing line having greater strength and flexibility, more resistance to decay, more durability in the cover and no tackiness.

I employ well known means to provide a center or core member of textile strands, either braided or laid parallel, and an enclosing coating of transparent, slightly elastic, flexible polyamide material, such as nylon or "perlon." The proportions of core member and coating are so adjusted that the greater portion of the breaking strength of the line resides in the coating or cover.

The coating is provided with continuous longitudinally extending grooves, which give the line a rough surface without a reduction in strength, and prevent slipping of knots in nets and also prevent slipping of the line in the hand.

Single lines may be plied to form thicker lines and replace hemp or cotton in the manufacture of nets, deep sea lines, snoods and the like.

When making lines or nets for trout fishing or for catching small herring, the core thread is made very small.

What I claim is:

A fishing line having a center of textile strands and a covering of transparent, slightly elastic, flexible, smooth polyamide material so proportioned that the greater portion of the breaking strength of the line is in the cover, and continuous longitudinally extending grooves on the surface of the cover.

ÖIVIN SAETHER.

REFERENCES CITED

The following references are of record in the file of this patent:

UNITED STATES PATENTS

| Number | Name | Date |
|---|---|---|
| 2,065,606 | Moore | Dec. 29, 1936 |
| 2,079,836 | Brown et al. | May 11, 1937 |
| 2,215,760 | Ledrich | Sept. 24, 1940 |
| 2,252,554 | Carothers | Aug. 12, 1941 |
| 2,257,953 | Haskell | Oct. 7, 1941 |
| 2,265,119 | Coolidge | Dec. 2, 1941 |
| 2,401,291 | Smith | May 28, 1946 |

FOREIGN PATENTS

| Number | Country | Date |
|---|---|---|
| 71,351 | Norway | Dec. 9, 1946 |
| 72,232 | Norway | June 23, 1947 |
| 72,234 | Norway | June 23, 1947 |